United States Patent [19]
Ota

[11] Patent Number: 5,295,233
[45] Date of Patent: Mar. 15, 1994

[54] CONTROLLER FOR PRINTING APPARATUS

[75] Inventor: Yuichi Ota, Anjo, Japan

[73] Assignee: Brother Kogyo Kabushiki Kaisha, Nagoya, Japan

[21] Appl. No.: 993,027

[22] Filed: Dec. 18, 1992

[30] Foreign Application Priority Data

Dec. 26, 1991 [JP] Japan .................................. 3-358984

[51] Int. Cl.$^5$ .............................................. G06F 15/00
[52] U.S. Cl. ...................................... 395/115; 395/112
[58] Field of Search ................. 395/115, 116, 164–166, 395/114, 113, 400, 425, 112; 400/70, 61, 62, 77; 358/404, 444

[56] References Cited

U.S. PATENT DOCUMENTS

| | | | |
|---|---|---|---|
| 4,968,159 | 11/1990 | Sasaki et al. | 400/76 |
| 5,108,207 | 4/1992 | Isobe et al. | 400/70 |
| 5,159,681 | 10/1992 | Beck et al. | 395/425 |
| 5,165,014 | 11/1992 | Vassar | 395/112 |

Primary Examiner—Arthur G. Evans
Attorney, Agent, or Firm—Oliff & Berridge

[57] ABSTRACT

When a narrowing down to one of the candidates for an operation mode is completed, a printing operation is performed in accordance with the printing system for the narrowed-down operation mode. If the narrowing-down to one operation mode is not completed, a counter value determining a storage capacity of a reception buffer of a RAM is increased so that a quantity stored in the reception buffer is increased accordingly. Thereafter, the narrowing-down of the candidates for the operation mode to one is performed again. Thus, a controller for a printing apparatus is provided which is capable of automatically determining an operation mode even when it is impossible to determine the operation mode from an initially provided quantity of printing information.

9 Claims, 5 Drawing Sheets

Fig.2B

| ITEM | INSTRUCTIONS |
|---|---|
| S1 | SELF TEST, INITIALIZE RAM, SET OPERATION MODE 0 |
| S2 | N=256, $N_{max}$=1024 |
| S3 | STORE N BYTES OF PRINTING INFORMATION FROM HOST IN RECEPTION BUFFER |
| S4 | CONTROL CODES CONTAINED ? |
| S5 | THE CONTROL CODES EXIST IN OPERATION MODE 0 ? |
| S6 | WITHDRAW 0 FROM CANDIDATES FOR OPERATION MODE |
| S7 | THE CONTROL CODES EXIST IN OPERATION MODE 1 ? |
| S8 | WITHDRAW 1 FROM CANDIDATES FOR OPERATION MODE |
| S9 | THE CONTROL CODES EXIST IN OPERATION MODE 2 ? |
| S10 | WITHDRAW 2 FROM CANDIDATES FOR OPERATION MODE |
| S11 | CANDIDATES NARROWED DOWN TO 1 ? |
| S12 | NO CANDIDATE FOR OPERATION MODE ? |
| S13 | COMMAND ERROR DISPLAY |
| S14 | SET UP THE OPERATION MODE |

Fig.3B

| ITEM | INSTRUCTIONS |
|---|---|
| S21 | TERMINATE INITIALIZATION |
| S22 | NARROWING-DOWN TO ONE OPERATION MODE COMPLETED ? |
| S23 | PRINT ACCORDING TO PRINTING SYSTEM FOR NARROWED-DOWN OPERATION MODE |
| S24 | N = N + 256 |
| S25 | $N \leq N_{max}$ ? |
| S26 | RETURN TO S3 OF INITIALIZATION PROGRAM |
| S27 | PRINT ACCORDING TO CODE SYSTEM FOR OPERATION MODE SELECTED FROM WITHIN CANDIDATES SO FAR NARROWED DOWN |

CONTROLLER FOR PRINTING APPARATUS

BACKGROUND OF INVENTION

1. Field of the Invention

The present invention relates to a controller for a printing apparatus able to simulate the operation modes of a plurality of different printing apparatus.

2. Description of Related Art

When a printing apparatus performs a printing operation in accordance with printing operation information input from a host computer or the like, it faithfully prints alphanumeric characters and the like in compliance with control codes (such as double size, line feed, and form feed) contained in the printing information. Further, in order to achieve a greater variety of printing styles, many of the latest printing apparatus have peculiar and characteristic operation modes. Such characteristic operation modes may include a high-speed mode to perform printing at a high speed and a designation mode designating a dot space and bit image. These modes are also specified by the control codes, particularly escape (ESC sequence) control codes included in the printing information.

Frequently, the control codes, such as the escape control codes, are defined differently depending on the model and manufacturer of the particular printing apparatus and, therefore, a particular printing apparatus cannot perform a normal printing operation unless the printing information is in conformity with its particular operation mode. Therefore, to correctly perform a printing operation, it becomes necessary to change the operation mode of the printing apparatus to correspond to the printing information.

In view of the necessity described above, such a printing apparatus has recently been developed which includes emulations of the operation modes of a plurality of different printing apparatus, which are stored in advance. Prior to the printing operation, the stored operation mode of one of the emulated printing apparatus is selected by an operator and printing information input into the printing apparatus is printed in accordance with the selected operation mode.

With such a printing apparatus, however, the operator is required to understand all of the differing operation modes stored in the printing apparatus and select one of the stored operation modes, thus causing concomitant disadvantages where the operation of the printing apparatus becomes complicated and an unskilled operator is liable to make a mistake in operating the printing apparatus.

Accordingly, the printing apparatus as disclosed in U.S. Pat. No. 4,968,159 to Sasaki et al, assigned to the same assignee as the present application and hereby incorporated by reference, emulates the operation modes of a plurality of printing apparatuses and, in selecting a particular operation mode, analyzes the control codes contained in a fixed quantity of printing information first input to the printing apparatus in order to automatically determine which one of the plurality of operation modes of the printing apparatus is prescribed in the printing information. There are such merits in this printing apparatus that its operation is not complicated, mishandling of it is unlikely, and even a beginner can use it easily.

Even in such a printing apparatus as described in Sasaki et al, which is provided with an automatic operation mode determination means, there is a difficulty that the operation mode cannot be determined from the fixed quantity of printing information initially input into the automatic operation mode determination means, in such a case as given below. Namely, in printing information which could correspond to one of a plurality of different operation modes, there are control codes common to various ones of the different operation modes. Hence, it sometimes occurs that only the common control codes are present in the fixed quantity of printing information input at first and the particular control codes which identify a particular operation mode are not present within the fixed quantity of printing information. Since in such a case the operation mode cannot be identified, the prior art apparatus has the disadvantage that it does not have a sufficient capability for determining the operation mode.

SUMMARY OF THE PRESENT INVENTION

Accordingly, an object of the present invention is to provide a controller for a printing apparatus capable of automatically and positively determining an operation mode even when the operation mode cannot be positively determined from an initial fixed quantity of printing information input.

The controller for a printing apparatus according to the present invention emulates the operation modes of a plurality of printing apparatus and causes the printing apparatus to perform a printing operation in conformity with a determined operation mode of one printing apparatus according to printing information input and comprises printing information storage means for storing printing information input to the printing apparatus, control code detection means for detecting control codes which identify the operation mode from the printing information stored in the printing information storage means, and operation mode determination means for analyzing the control codes detected by the control code detection means to determine which one of the plurality of operation modes is prescribed in the printing information, wherein the printing information storage means comprises a variable capacity storage means and the operation mode determination means, if unable to determine which particular operation mode is prescribed by the printing information from an initial fixed quantity of printing information stored in the printing information storage means, increases the quantity of printing information stored in the variable capacity storage means and again attempts to determine the operation mode prescribed by the printing information.

Printing information input from the outside is once stored in the printing information storage means. Then, control codes for determining the mode of printing are detected in the printing information stored in the printing information storage means by the control code detection means. The detected control codes are analyzed to determine which one of the plurality of operation modes is the operation mode prescribed in the printing information.

If it is impossible to determine which particular operation mode is prescribed from the initial fixed quantity of printing information input, the determination of the operation mode is performed again after increasing the quantity of printing information stored in the variable capacity printing information storage means. When the data quantity is increased as described above, it becomes more likely that the control codes which identify the particular operation mode (hereinafter called "identification control codes") are contained in the stored printing information. The particular operation mode can then be determined by detecting such identification control codes. The quantity of printing information may be increased a plurality of times until the identification control codes appear.

BRIEF DESCRIPTION OF THE DRAWINGS

FIGS. 2A and 2B show a flow chart showing an initialization program; and

FIGS. 3A and 3B show a flow chart showing the program of an interrupt routine.

DESCRIPTION OF THE PREFERRED EMBODIMENT

Figure 1:
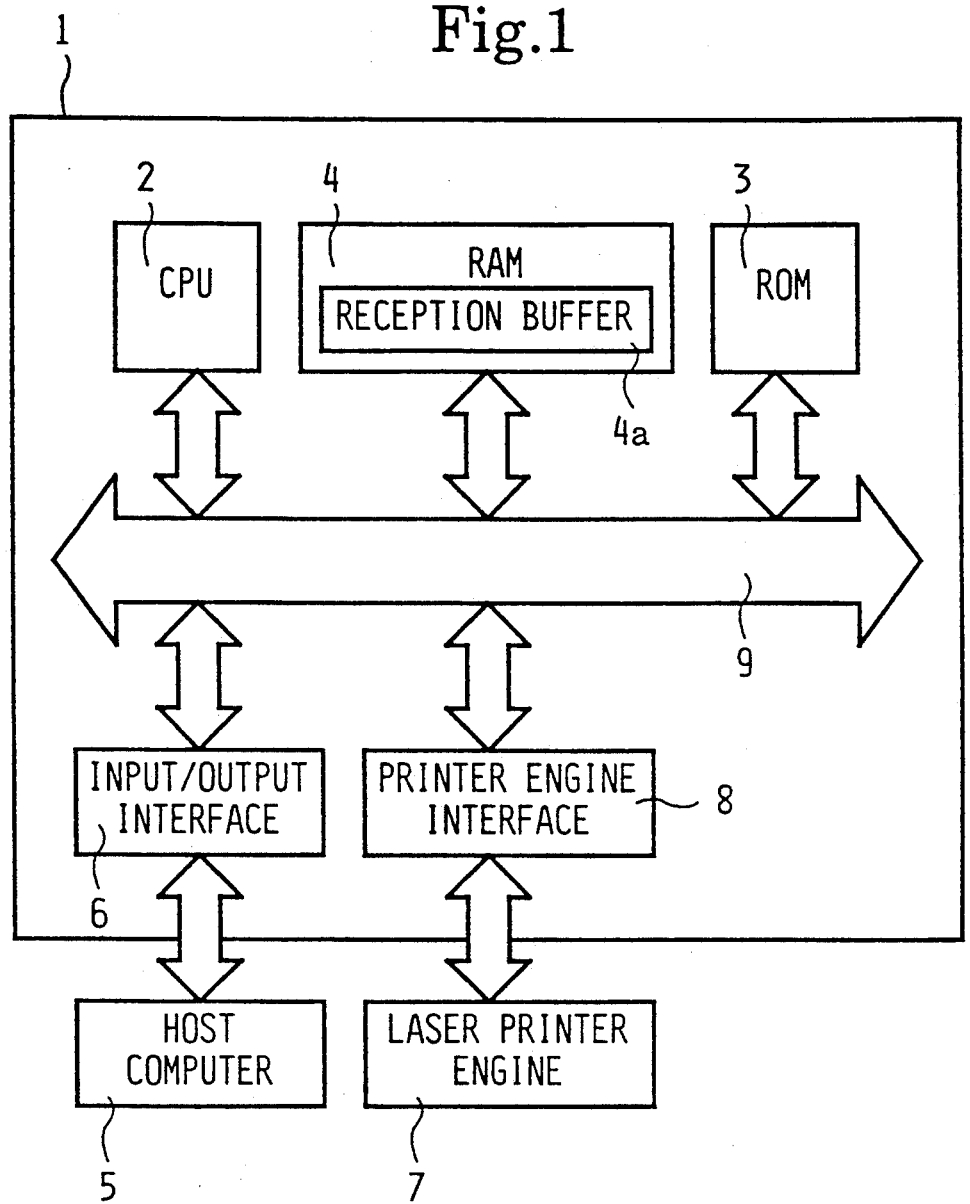
FIG. 1 is a block diagram showing one preferred embodiment of the present invention.

An embodiment of the present invention will be described below with reference to the accompanying drawings. FIG. 1 is a block diagram showing an electrical arrangement of a controller 1 for a laser printer of a printing apparatus. The controller 1 comprises a CPU 2 for overall control of the laser printer, a ROM 3 for storing various control programs, a RAM 4 having a reception buffer 4a as a variable capacity printing information storage means, an input/output interface 6 for communication with a host computer 5, a printer engine interface 8 for communicating with a laser printer engine 7, and a bus 9 interconnecting all of the above elements.

Figure 2A:
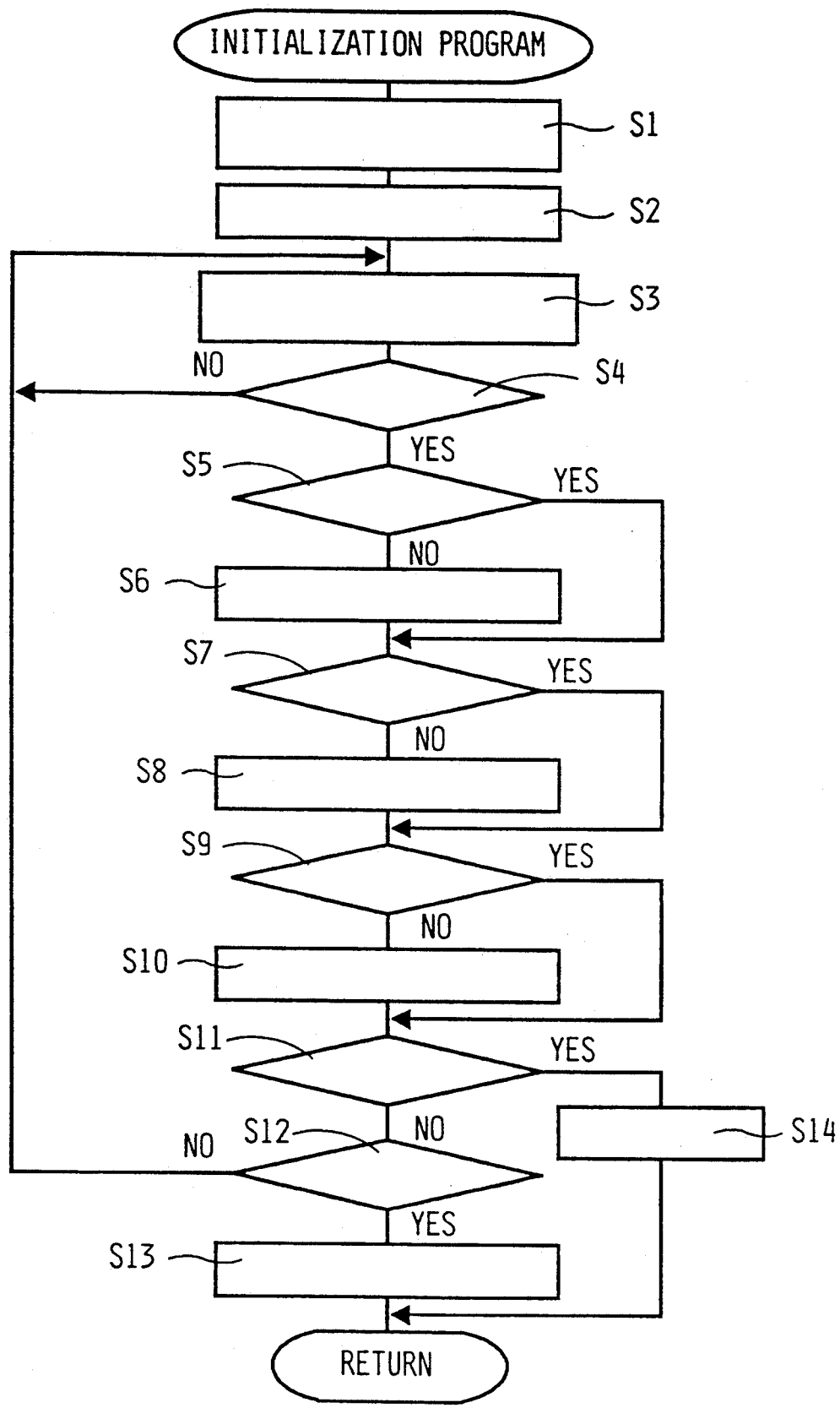

Operation of the laser printer engine 7 is controlled by the controller 1 by reading printing information input from the host computer 5. The ROM 3 in the controller 1 stores such programs as an initialization program as shown in FIGS. 2A and 2B, and a program for a interrupt routine shown in FIGS. 3A and 3B, in addition to the main controlling programs (not shown). According to such programs, the CPU 2 of the controller 1 functions as control code detection means for detecting control codes present in the stored printing information and also functions as operation mode determination means for analyzing the control codes detected by the control code detection means and for determining which one of the plurality of operation modes is the operation mode (emulation) prescribed in the printing information. In the present embodiment, three different operation modes (0, 1, 2) are provided as operation modes which can be emulated. However, it should be understood that an unlimited number of control modes can be emulated.

Further, in the present embodiment, the capacity of the reception buffer 4a of the RAM 4 is variable so that, when the particular operation mode cannot be identified from the initial fixed quantity of printing information stored in the reception buffer 4a, the number of bytes (stored data quantity) of the reception buffer 4a is increased and the determination of the operation mode is performed again. The operation mode determination process is described below.

The initialization program shown in FIGS. 2A and 2B is automatically started by the CPU 2 when power for the laser printer is turned on, and may be started when a new job is received from the host computer 5. In the initialization program, first, an initializing process for initializing the whole of the apparatus is performed (step S1). In the initializing process, self tests, initializing of the RAM 4, and a provisional selection of the operation mode "0" from the three operation modes (0, 1, 2) provided in the apparatus are performed.

After the initializing process has been performed, a counter value N for determining the storage capacity (N bytes) of the reception buffer 4a assigned to a predetermined address in the RAM 4 is set, for example, to 256 and, at the same time, a counter value $N_{max}$ for determining the maximum value of the storage capacity ($N_{max}$ bytes) Of the reception buffer 4a is set for example to 1024 (step S2). Thereafter, printing information output from the host computer 5 is received and stored in the RAM 4 and N bytes (256 bytes) of the printing information is stored in the reception buffer 4a (step S3). Then, it is determined whether or not control codes are present in the printing information stored in the reception buffer (step S4). If control codes are not found, the decision becomes "NO" in step S4. Then, the flow returns to step S3, and 256 different bytes, for example, of printing information are stored in the reception buffer. Because the time necessary for the control code detection means and the operation mode determining means to process the N bytes of printing information is inversely proportional to the size of N, it is faster for the controller to choose a different set of 256 bytes of printing information than to simply add another 256 bytes of printing information to the quantity of printing information already stored in the reception buffer 4a.

When the decision in step S4 is "YES," that is, when control codes are contained in the printing information stored in the reception buffer 4a, the process proceeds to step S5. In step S5, it is determined whether or not the detected control codes are present in the control code system for the operation mode "0". If the detected control codes are not used in the operation mode "0" (i.e., they do not "exist" in operation mode "0"), the decision in the step 5 becomes "NO" and "0" is withdrawn from the candidates for the operation mode (step S6).

On the other hand, when the detected control codes are present in the control code system for the operation mode "0," the decision in step S5 becomes "YES" and the process proceeds to step S7. In step S7, it is determined whether or not the detected control codes are present in the control code system for the operation mode "1", and if they are not, the decision becomes "NO" in step S7 and "1" is withdrawn from the candidates for the operation mode (step S8), but if they are present, the decision in step S7 becomes "YES" and the process proceeds to step S9.

In step S9, it is determined whether or not the detected control codes are present in the control code system for the operation mode "2," and if they are not, the decision in the step S9 becomes "NO" and "2" is withdrawn from the candidates for the operation mode (step S10), but if they are present, the decision in step S9 becomes "YES" and the process proceeds to step S11. If more than 3 operation modes are to be used, additional steps identical to steps S9 and S10 can be added between steps S10 and S11 for each such additional operation mode.

As described above, the candidates for the operation mode are narrowed down through the steps S5 to S10. In step S11, it is determined whether or not the candidates for the operation mode have been narrowed down to one. If the decision is "NO," the process proceeds to step S12. If there is no candidate for the operation mode by some abnormality or other, the decision in step S12 becomes "YES" and a command error display is made (step S13) and this initialization program is ended.

On the other hand, when there are a plurality of candidates for the operation mode, the decisions in both of the steps S11 and S12 become "NO." Then, the process returns to step S3 where a different 256 bytes of printing information is stored into the reception buffer. Thereafter, the process for narrowing down the candidates for the operation mode is repeated. Through such operations, when the candidates for the operation mode have been narrowed down to one, the decision in step S11 becomes "YES." Now, the candidate for the operation mode is set to the operation mode of the printing apparatus to be operated (step S14) and the initialization program is ended.

Figure 3A:
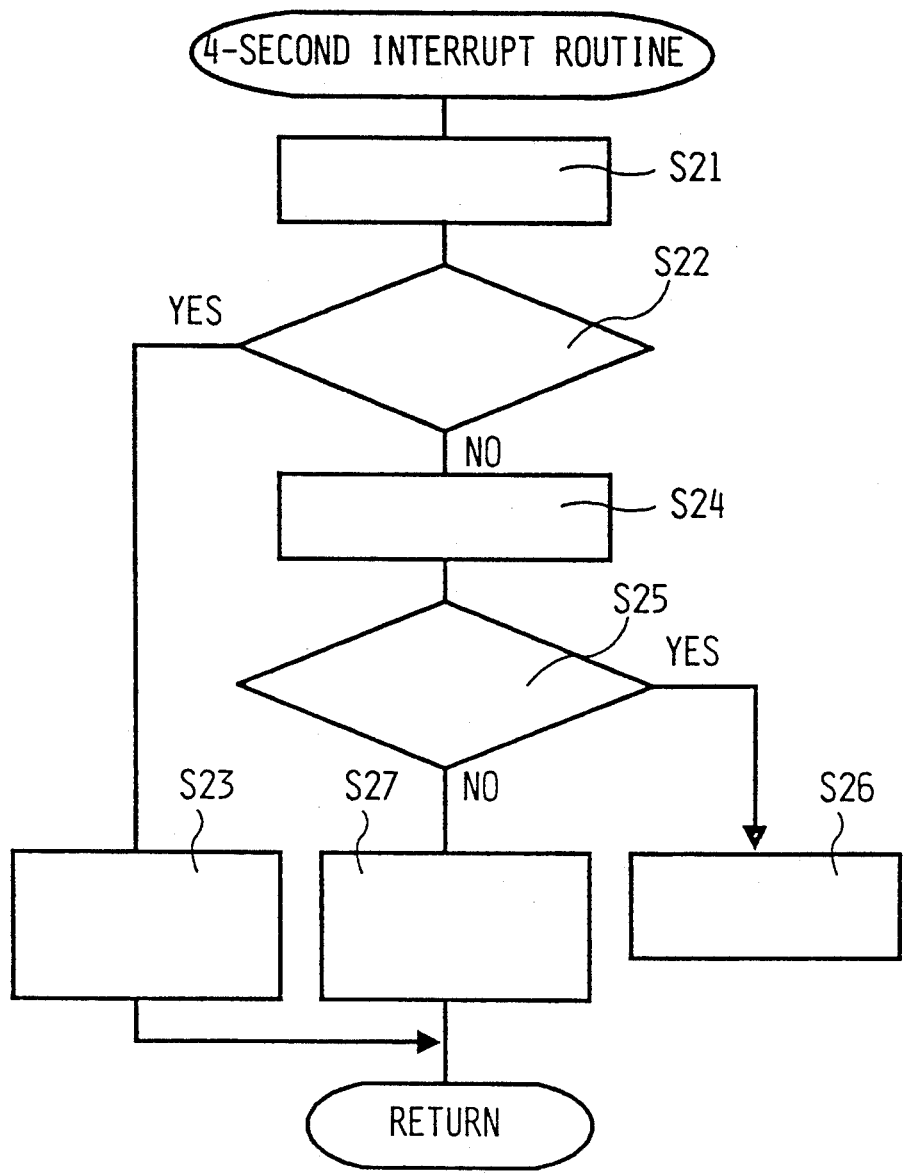

While the initialization program is being executed as described above, the CPU 2 counts time with a time counter incorporated therein (not shown) and interrupts the execution of the initialization program when, for example, four seconds have passed after the reception of the printing information and starts processing an interrupt routine shown in FIGS. 3A and 3B. While, as set forth above, it is generally more efficient to choose a new set of 256 bytes of printing information, if, after enough time, the candidates have not been narrowed down to one for any previous single set of N bytes, it becomes more efficient to increase the size of N. Thus, after some predetermined time, the interrupt will time out, switching control to the interrupt routine.

In the interrupt routine, first, the execution of the above described initialization program is terminated (step S21). Then, it is determined whether or not the narrowing-down of candidates for the operation mode to one is completed through the execution of the initialization program (step S22). If it is completed, the decision in the step 22 becomes "YES," the process proceeds to step S23, where the printing operation is performed according to the printing system for the narrowed-down operation mode.

On the other hand, when the narrowing-down of the candidates for the operation mode to one is not completed, the decision in step S22 becomes "NO," and the process proceeds to step S24. In step S24, the counter value N determining the storage capacity (N bytes) of the reception buffer 4a assigned to a predetermined address of the RAM 4 is increased by 256 so that the quantity of printing information stored in the reception buffer 4a is increased. The increased counter value N is compared with the maximum byte number $N_{max}$ of the reception buffer 4a (step S25). If $N \leq N_{max}$, the decision in step S25 becomes "YES," and the process returns to step S3 of the initialization program (step S26). Thereafter, the process for narrowing down the candidates for the operation mode is repeated.

In the case described above, as the quantity of printing information stored in the reception buffer 4a is increased, the probability will increase that the identification control codes which will identify one particular operation mode will be included. When such identification control codes are detected, the narrowing-down of the operation modes is completed and the initialization program comes to an end. If the identification control codes are not detected from the once-increased quantity of printing information in the predetermined time, the interrupt routine is executed again and the quantity of printing information stored in the reception buffer 4a is further increased by 256 bytes and the narrowing-down of candidates for the operation mode is repeated with the increased quantity of printing information.

Thus, the interrupt routine is repeated until the narrowing-down of the candidates for the operation mode is completed, with the quantity of printing information to be stored in the reception buffer 4a successively increased from 256 bytes, through 512 bytes and 768 bytes, to 1024 bytes. When, during such repetitions of the interrupt routine, the counter value N exceeds the maximum number of bytes $N_{max}$ (1024) of the reception buffer 4a, the decision in step S25 becomes "NO." Then, the process proceeds to step S27, wherein a printing operation is performed according to the code system for an operation mode which has been arbitrarily selected from the current narrowed-down list of candidates for the operation mode.

According to the present embodiment as described above, the reception buffer 4a of the RAM 4 has a variable storage capacity, so that, should it be impossible to determine which one of the plurality of operation modes is prescribed by the initial fixed quantity of printing information stored in the reception buffer 4a, the determination of the operation mode is made again after increasing the number of bytes of the reception buffer 4a. Therefore, it becomes possible to positively determine an operation mode for the printing information, when it has not been possible to positively determine the operation mode from a fixed quantity of printing information in the prior art. Thus, the capability of determining the operation mode has been improved.

In view of the fact that the narrowing-down of the candidates for the operation mode to one can be achieved in many cases if the quantity of printing information is around 256 bytes, the controller it is arranged such that the narrowing-down of the operation mode is performed at first with 256 bytes of printing information. Thus, such a merit is obtained that the processing speed can generally be increased as compared with the case where a larger quantity of printing information is used initially.

Although the minimum value (initial value) of the quantity of printing information stored in the reception buffer 4a was set to 256 bytes in the present embodiment, it is not limited to that value, i.e., it may, for example, be 512 bytes. Although the quantity was increased by 256 bytes each time, it may be increased, for example, by 512 bytes.

Further, the maximum value of the quantity stored in the reception buffer 4a is not limited to 1024 bytes but it may, for example, be 2048 bytes, 4096 bytes, and so on. Otherwise, the maximum processing time for the narrowing-down of the candidates for the operation mode may be determined in advance so that the narrowing-down process (with the quantity increased) is suspended when the maximum processing time has passed.

Although it is arranged in the present embodiment such that three operation modes (0, 1, 2) are emulated, it will of course be well to arrange such that two, four or more operation modes can be emulated.

Further, the present invention can be applied not only to a laser printer but also to other printing apparatuses such as a dot printer. Thus, various modifications and changes can be possible within the scope not departing from the spirit of the invention.

As apparent from the description given above, it is arranged in the present invention such that the capacity of the printing information storage means is variable and, when it is impossible to determine which one of the plurality of operation modes is prescribed from an initial fixed quantity of printing information stored in the printing information storage means, the determination of the operation mode is attempted again after increasing the quantity of printing information stored in the printing information storage means. Therefore, it becomes possible to positively determine an operation mode.

While advantageous embodiments have been chosen to illustrate the invention, it will be understood by those skilled in the art that various changes and modifications can be made therein without departing from the scope of the invention as defined in the appended claims.

What is claimed is:

1. A controller for a printing apparatus, comprising:
   an input/output interface connected to at least one host computer;
   a printer engine interface connected to at least one print engine;
   first memory means for storing a plurality of sets of control codes, each set of control codes corresponding to one of a plurality of operation modes;
   second memory means for storing printing information input from the at least one host computer and including a storage means having a first capacity storing a variable amount of printing information, a current quantity of printing information being stored in the storage means;
   control code detection means for detecting control codes included in the current quantity of printing information stored in the storage means;
   operation mode determining means for determining an operation mode according to the one of the plurality of sets of control codes which is most compatible with the control codes detected by the detecting means; and
   adding means for adding a further quantity of printing information to the current quantity of printing information stored in the storage means only when said operation mode detecting means fails to determine exactly one operation mode.

2. The controller of claim 1, further comprising interrupt means for interrupting said determining means after a predetermined time, wherein after said interrupt means interrupts said determining means, said adding means is executed.

3. The controller of claim 1, wherein the operation mode determining means includes narrowing down means for successively determining which ones of the plurality of sets of control codes the detected control codes exist in.

4. The controller of claim 3, further comprising an interrupt means for interrupting the determining means after a predetermined time and a selecting means for selecting one of the narrowed down plurality of sets of control codes as most compatible with the detected control codes if the determining means fails to narrow the plurality of sets of control codes down to one when the storage means is at the first capacity, wherein after said interrupt means interrupts said determining means, said adding means is executed.

5. A controller for a printing apparatus, comprising:
   an input/output interface connected to at least one host computer;
   a printer engine interface connected to at least one print engine;
   printing information storage means for storing printing information input from the at least one host computer, and comprising a storage means storing a current quantity of printing information;
   control code detection means for detecting control codes included in the current quantity of printing information stored in the storage means;
   operation mode determination means for determining one of a plurality of operation modes according to the detected control codes, and including storage means increasing means for increasing the quantity of printing information stored in the storage means; and
   adding means for adding a further quantity of printing information to the current quantity of printing information stored in the storage means only when said operating mode detecting means fails to determine exactly one operation mode.

6. A method for determining an emulation operation mode for a printing apparatus, comprising the steps of:
   (a) inputting printing information from a host computer;
   (b) storing the printing information in a printing information storage means, the storage means having a first capacity;
   (c) storing a first quantity of the printing information as a current quantity in the printing information storage means such that the printing information storage means is only partially filled;
   (d) detecting control codes in the current quantity of printing information stored in the printing information storage means;
   (e) determining one of a plurality of operation modes according to the detected control codes;
   (f) outputting the input printing information to a print engine based on the determined operation mode; and
   (g) adding a second quantity of printing information to the current quantity stored in the printing information only when the determining step fails to determine exactly one operation mode and returning to step (d).

7. The method of claim 6, wherein the adding step further comprises:
   determining if the current quantity of printing information stored in the printing information storage means exceeds the first capacity;
   determining which operation modes accord with the detected control codes;
   selecting one of the determined operation modes; and
   returning to step (f).

8. The controller of claim 5, further comprising interrupt means for interrupting said determining means after a predetermined time, wherein after said interrupt means interrupts said determining means, said adding means is executed.

9. The method of claim 6, further comprising the step of interrupting said determining step after a predetermined time, wherein after said determining step is interrupted, performing said adding step.

* * * * *